(12) United States Patent
Berriah et al.

(10) Patent No.: US 12,195,863 B2
(45) Date of Patent: Jan. 14, 2025

(54) METHODS AND SYSTEMS FOR DETECTING FAULTS IN ELECTROLYSERS HAVING ELECTROLYSIS CELLS

(71) Applicant: RECHERCHE 2000 INC., Montreal (CA)

(72) Inventors: Said Berriah, Laval (CA); Daniel Buades Marcos, Montreal (CA); Gilles J. Tremblay, Montreal (CA)

(73) Assignee: RECHERCHE 2000 INC., Montreal (CA)

( * ) Notice: Subject to any disclaimer, the term of this patent is extended or adjusted under 35 U.S.C. 154(b) by 973 days.

(21) Appl. No.: 17/149,802

(22) Filed: Jan. 15, 2021

(65) Prior Publication Data

US 2021/0222309 A1    Jul. 22, 2021

Related U.S. Application Data

(60) Provisional application No. 62/961,773, filed on Jan. 16, 2020.

(51) Int. Cl.
*C25B 15/023* (2021.01)
*G06N 3/04* (2023.01)
*G06N 3/08* (2023.01)

(52) U.S. Cl.
CPC .......... *C25B 15/023* (2021.01); *G06N 3/04* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 6,591,199 B2 | 7/2003 | Tremblay et al. | |
| 2001/0039481 A1* | 11/2001 | Tremblay | H01M 8/04552 702/35 |
| 2006/0289312 A1 | 12/2006 | Tremblay et al. | |
| 2019/0266475 A1* | 8/2019 | Wierstra | G06N 3/092 |

FOREIGN PATENT DOCUMENTS

| | | |
|---|---|---|
| JP | 2013 525603 A | 2/1993 |
| JP | 2003 530483 A | 2/1995 |
| WO | 2019189501 | 5/2019 |
| WO | 2019221985 | 11/2019 |

OTHER PUBLICATIONS

Liu Jawai et al., "Sequence Fault Diagnosis for PEMFC Water Management Subsystem USing Deep Learning With t-SNE", IEEE Access, vol. 7, Jul. 5, 2019, pp. 92009-92019.
Extended European Search Report issued on May 27, 2021 in counterpart EP application.

* cited by examiner

*Primary Examiner* — Louis J Rufo
(74) *Attorney, Agent, or Firm* — NORTON ROSE FULBRIGHT CANADA LLP

(57) ABSTRACT

Methods, systems, and assemblies for detecting faults in an electrolyser having a plurality of electrolysis cells are described. The method comprises obtaining voltage measurements of the electrolysis cells during operation of the electrolyser, generating synthetic cell voltages for the electrolysis cells using a neural network architecture that takes into account normal cell degradation based on cell-specific parameters, comparing the voltage measurements to the synthetic cell voltages for corresponding ones of the electrolysis cells to obtain voltage differences, and detecting a fault in the electrolyser when at least one of the voltage differences reaches a threshold.

16 Claims, 5 Drawing Sheets

METHODS AND SYSTEMS FOR DETECTING FAULTS IN ELECTROLYSERS HAVING ELECTROLYSIS CELLS

CROSS-REFERENCE TO RELATED APPLICATIONS

The present application claims the benefit of U.S. Provisional patent Application No. 62/961,773 filed on Jan. 16, 2020, the contents of which are hereby incorporated by reference in their entirety.

TECHNICAL FIELD

The present disclosure relates generally to electrolysers and more particularly to fault detection in electrolyser cells.

BACKGROUND OF THE ART

Chlor-Alkali Electrolysis is the process of decomposing a lower value chemical (e.g. NaCl, KCl) into a higher value chemical (e.g. NaOH, Cl2, KOH) by applying a direct electrical current. This reaction take place in an electrochemical cell. In an industrial setting, several cells are combined in series or parallel to perform the reaction. This combination is called an electrolyser.

Chlor-alkali electrochemical cells are composed of an anode, a cathode and a separator. An oxidation reaction takes place at the anode and a reduction reaction takes place at the cathode. In some cases, an ion exchange membrane can be used to separate the anodic reaction from the cathodic reaction. For chlor-alkali electrochemical cells, primary products of electrolysis are chlorine, hydrogen and sodium or potassium hydroxide, also called "caustic".

There is a need for improved methods of detecting faults in electrolyser cells.

SUMMARY

In accordance with a broad aspect, there is provided a method for detecting faults in an electrolyser having a plurality of electrolysis cells. The method comprises obtaining voltage measurements of the electrolysis cells during operation of the electrolyser, generating synthetic cell voltages for the electrolysis cells using a neural network architecture that takes into account normal cell degradation based on cell-specific parameters, comparing the voltage measurements to the synthetic cell voltages for corresponding ones of the electrolysis cells to obtain voltage differences, and detecting a fault in the electrolyser when at least one of the voltage differences reaches a threshold.

In accordance with another broad aspect, there is provided a system for detecting faults in an electrolyser having a plurality of electrolysis cells. The system comprises a processing unit and a non-transitory computer-readable medium having stored thereon program code. The program code is executable by the processing unit for obtaining voltage measurements of the electrolysis cells during operation of the electrolyser, generating synthetic cell voltages for the electrolysis cells using a neural network architecture that takes into account normal cell degradation based on cell-specific parameters, comparing the voltage measurements to the synthetic cell voltages for corresponding ones of the electrolysis cells to obtain voltage differences, and detecting a fault in the electrolyser when at least one of the voltage differences reaches a threshold.

In accordance with yet another broad aspect, there is provided an assembly comprising an electrolyser having a plurality of electrolysis cells and at least one computing device operatively coupled to the electrolyser. The at least one computing device comprises at least one processing unit and a non-transitory computer readable medium having stored thereon program instructions. The program instructions are executable by the at least one processing unit for obtaining voltage measurements of the electrolysis cells during operation of the electrolyser, generating synthetic cell voltages for the electrolysis cells using a neural network architecture that takes into account normal cell degradation based on cell-specific parameters, comparing the voltage measurements to the synthetic cell voltages for corresponding ones of the electrolysis cells to obtain voltage differences, and detecting a fault in the electrolyser when at least one of the voltage differences reaches a threshold.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Chlor-alkali production is an energy-consuming process, thus the efficiency of each electrochemical cell is an issue to be considered during operation. Another issue for consideration in the operation of chlor-alkali electrochemical cells is the prevention of hazards such as gas release, fire and liquid leakage. There are described herein methods and systems for early detection of faults occurring in a chlor-alkali electrolysis cell functioning in series with other cells in an electrolyser. The method comprises acquiring voltages and processing measurements of the cells representing healthy behavior. A neural network model is built based on an encoder-decoder architecture and the voltage of the cells is predicted using the neural network model. The predicted voltages are compared with measured voltages in order to detect abnormal deviations while taking into account normal cell degradation.

Figure 1:
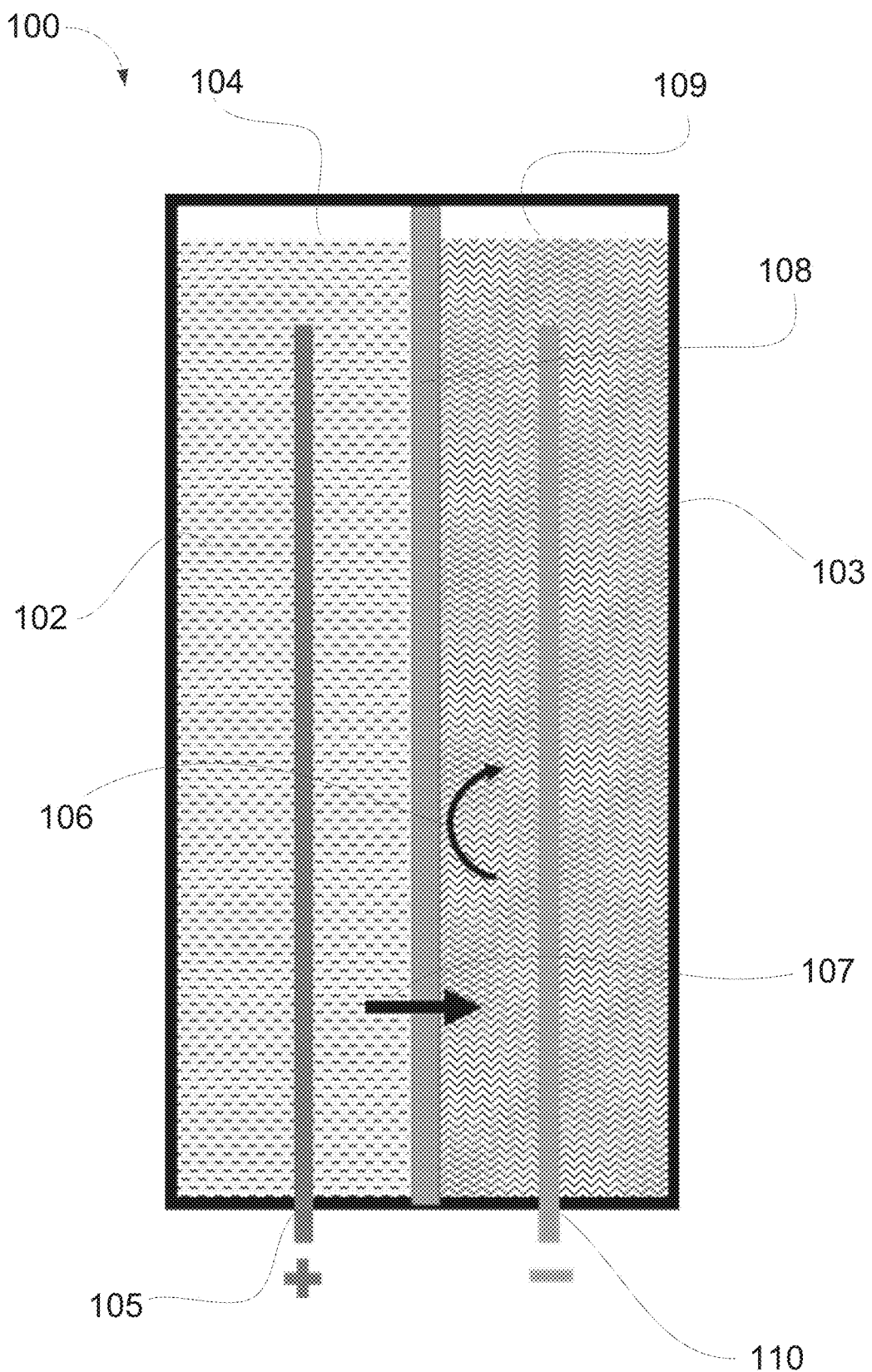
FIG. 1 is a schematic diagram of an example electrolysis cell.

FIG. 1 is a schematic representation of an example membrane cell 100 used in the Chlor-alkali industry. It may be composed of two compartments. In the case of salt electrolysis (NaCl), an anode compartment 102 is filled with a saturated brine solution (NaCl) while a dilute caustic soda passes through a cathode compartment 103. In chlor-alkali plants, chlorine (Cl2) 104 is generated at a coated (for example Titanium (Ti)) anode 105. The combination of hydroxide ions 106 with migrated sodium ions 107 across a selective membrane 108 generates caustic soda (NaOH) and Hydrogen gas 109. A cathode 110 may be nickel with a catalytic coating to reduce the over-potential for hydrogen (H2) build up.

Voltage variations in the membrane cell 100 may be the result of physical changes within the cell components. The cell voltage drop is distributed between its components: anode 105, cathode 110, membrane 108 and electrical connections. A decrease or increase in the cell voltage may be considered as a premise to two types of degradations: (1) normal degradation and the end of the cell's lifetime and (2) abnormal/sudden degradation during its lifetime. A cell may degrade abnormally because of a failing membrane 108 not separating properly the two compartments 104, 109, thus allowing undesired chemical reactions. It may also abnormally degrade due to electrodes 105, 110 losing their activation coatings. It can also degrade abnormally due to a combination of a failing membrane 108 and electrodes 105, 110. Root causes of components failing may be due to (external) poor operating conditions of the electrolyser or the cell itself. These conditions may be, but are not limited to: poor inlet flow, poor inlet contaminants control, electrical hazards, poor temperature control, poor equipment mounting, etc.

A synthetic voltage is calculated for one or more of the cells 100 in a chlor-alkali electrolyser for early detection of abnormal degradations of the cells. This synthetic voltage is a calculation of a mathematical function composed of many parameters that are estimated. Some of these parameters are operation specific, identical for all the cells that perform the electrolysis for the same operating conditions. Some of the parameters are cell-specific parameters. The calculation may take into account the normal degradation of a cell 100 that changes over time. An example mathematical function is described below:

$$\tilde{v}=f(I(t-d \ldots t), T(t-d \ldots t), CC(t-d \ldots t), g(I_{SU}, T_{SU}, CC_{SU}, V_{SU}))$$

Where f is any linear or non-linear function, I is a main rectifier current, T is catholyte outlet temperature, CC is caustic concentration, t is a time stamp, d is a backward time delay, g is any linear or non-linear function, and $I_{SU}$, $T_{SU}$, $CC_{SU}$, $V_{SU}$ are current, temperature, caustic concentration and voltage at startup.

Individual cell voltage of an electrolyser may be monitored during operation to detect abnormal variations leading to severe safety issues. However, if only abnormal degradations are considered, faults are detected when the cells have already reached a point of no return and need to be replaced. In order to avoid this issue, normal cell degradation is also considered.

The voltage drop of a cell 100 is ohmic and thus the relationship between a feeding current and a cell's voltage is proportional. A theoretical voltage estimated based on this proportionality can be used to characterize a healthy cell. However, cell characterization using only current-voltage proportionality does not take into account underlying complex effects occurring in the anode and cathode compartments 104, 109. Therefore, several other parameters, such as cell specificity due to age, technology, and position, are also considered.

For the same operating conditions and normal degradation level, the voltage of a given cell may differ from the voltage of other cells in the same electrolyser. This difference may be induced by disparities in manufacturing, installation, and other factors difficult to quantify. Cell-specific parameters such as age, technology, and position may therefore be used.

The voltage drifts of a cell may occur slowly over time due to its degradation. Furthermore, there may be a delay between a change in operating conditions of an electrolyser and the response of the cell. In order to account for this delay, the operating conditions at previous time-steps may be considered by the prediction model.

In order to early predict abnormal degradation, the predicted voltage is independent from the measured voltage. As such, the measured voltage is not used as an input to the prediction model.

In some embodiments, a synthetic voltage is calculated for the cells of the electrolyser using a neural network modeling architecture. This model is deployed in a production environment, where operating conditions are not pre-defined, and each one of the cells has a different level of normal degradation. The neural network model may be based on an encoder-decoder architecture, where the decoder is replaced with a predictor—a subnetwork that predicts the cell's voltage. A neural encoder is a type of neural architecture whose objective is to take an input vector and reduce its dimensionality to a desired one. It may be paired with a decoder. The decoder receives the output of the encoder and transforms it to minimize an objective function.

The neural encoder may be used to find features that represent the specificity of the cells at operation cycles and thus the normal degradation. The predictor may take into account temporal delays of the measurements. The predictor does not use the measured voltage as an input, yet it is still able to predict a different voltage for each cell, despite using the same operating conditions as input. It accomplishes this by taking the output of the encoder as an input, which is unique for each cell. Hence, the voltage prediction is not biased by the cell's measured voltage.

Figure 2:
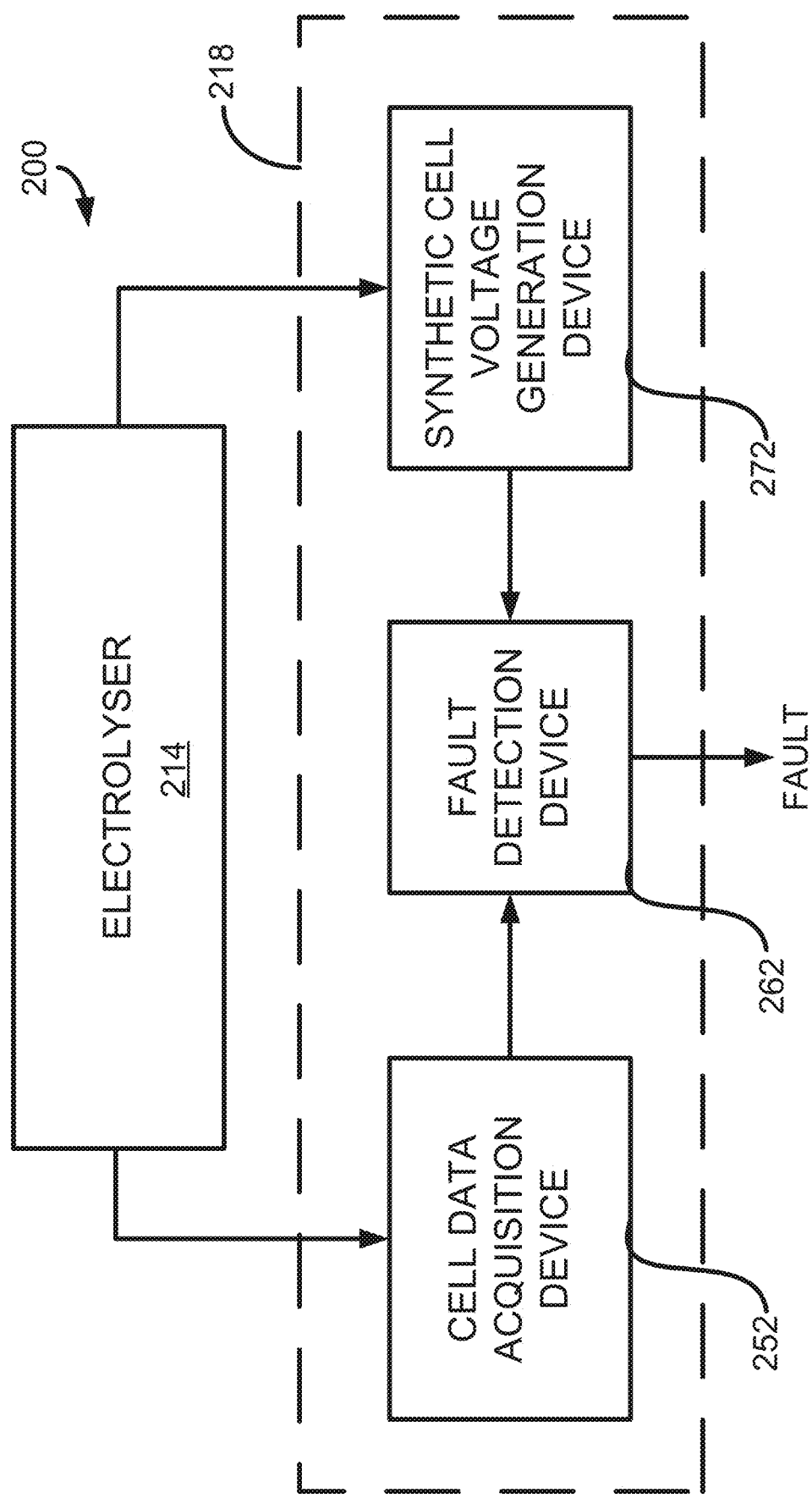
FIG. 2 is a block diagram of an example assembly for detecting faults in an electrolyser.

With reference to FIG. 2, there is illustrated an example embodiment of an assembly 200 comprising an electrolyser 214 and a fault detection system 218. The fault detection system 218 is composed of at least one computing device operatively coupled to the electrolyser 214. In the embodiment illustrated, the fault detection system 218 comprises a cell data acquisition device 252, a synthetic cell voltage generation device 272 and a fault detection device 262.

The cell data acquisition device 252 is configured for obtaining voltage measurements of the plurality of electrolysis cells during operation of the electrolyser 214. The voltage measurements may be obtained in real time or pseudo-real time. A single unit or multiple units may be connected to the various cells in order to obtain the voltage measurements. In some embodiments, voltage measurements are obtained for each cell of the electrolyser 214.

The synthetic cell voltage generation device 272 is configured for generating cell-specific synthetic cell voltages using a neural network architecture. The neural network takes into account normal cell degradation based on cell-specific parameters in order to estimate the cell-specific synthetic cell voltages. In some embodiments, the neural network comprises an encoder subnetwork and a predictor subnetwork. The encoder subnetwork may be configured for determining the normal cell degradation based on the cell-specific parameters. The predictor subnetwork may be configured for predicting the synthetic cell voltages using the normal cell degradation output by the encoder subnetwork. In some embodiments, the predictor subnetwork is further configured for applying temporal delays when predicting the synthetic cell voltages.

Various neural network architectures may be used in order to generate the cell-specific synthetic cell voltages. For example, the encoder subnetwork may comprise a masking layer, a Long Short-Term Memory layer, and two dense layers, and output a two-dimensional vector representing the cell-specific normal cell degradation. The predictor subnetwork may comprise two Long Short-Term Memory layers and two dense layers. Other embodiments are also applicable depending on practical implementations.

In some embodiments, the neural network is trained using historical data from the cells of the electrolyser 214. In some embodiments, the neural network is trained using historical data from cells of a plurality of electrolysers. Various techniques for training the neural network to understand healthy cell behavior while taking into account normal cell degradation based on cell-specific parameters may be used.

The fault detection device 262 compares the voltage measurements from the cell data acquisition device 252 to the synthetic cell voltages from the synthetic cell voltage generation device 272 for corresponding ones of the electrolysis cells to obtain voltage differences. For example, each electrolysis cell may be assigned a measured voltage and a synthetic voltage, and a difference between the measured voltage and the synthetic voltage corresponds to a voltage difference. In some embodiments, voltage measurements are obtained for a subset of the cells in the electrolyser 214. In some embodiments, voltage measurements are obtained for a plurality of subsets of cells in an alternating manner. Other embodiments may also apply.

When one or more of the voltage differences reaches a threshold, a fault is detected by the fault detection device 262. In some embodiments, detecting a fault comprises issuing an alert signal, which may be audio, visual, or other, to bring the fault to the attention of one or more operator. In some embodiments, detecting a fault comprises issuing a shutdown signal to the electrolyser 214 or to another device or system configured for causing the electrolyser 214 to shut down. A combination of alert signal and shutdown signal may be used. For example, a first threshold may be associated with an alert signal and a second threshold may be associated with a shutdown signal. When a voltage difference is within a first range, an alert signal is issued and when a voltage difference is within a second range greater than the first range, a shutdown signal is issued. In another example, the nature of the fault signal may be related to the number of cells showing a voltage difference having reached the threshold. For example, if the voltage difference reaches the threshold for a first number of cells, an alert signal is issued, if the voltage difference reaches the threshold for a second number of cells greater than the first number of cells, a shutdown signal is issued. Other variants may also apply.

Figure 3:
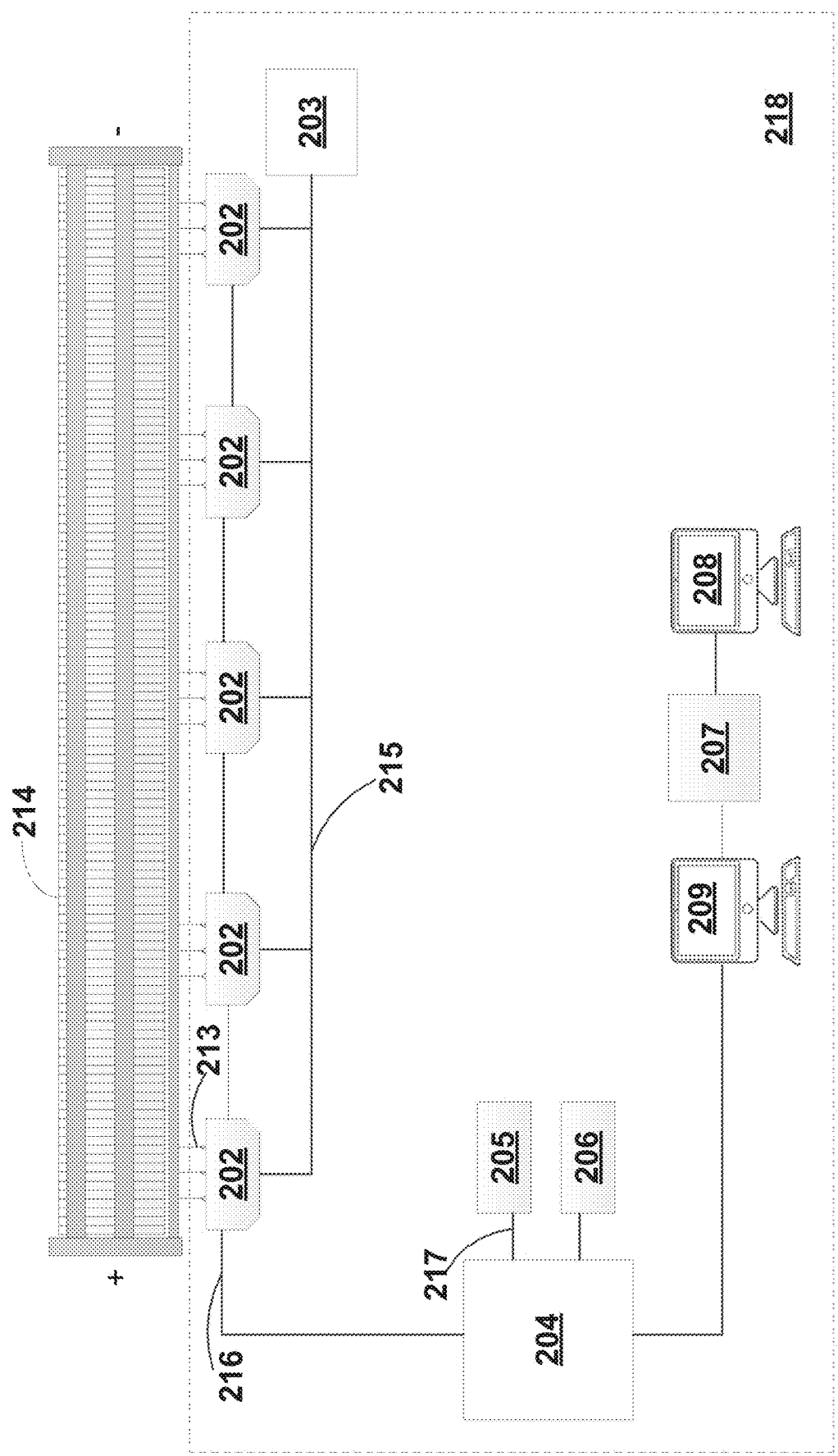
FIG. 3 is a block diagram of an example embodiment for a fault detecting system.

Referring to FIG. 3, there is illustrated a specific and non-limiting example for the fault detection system 218. Data acquisition and transmission units 202 measure the differential voltages of the cells from cathode to cathode or anode to anode in the electrolyser 214 with a given accuracy, such as +/−1 millivolt or other precision levels. The electrolyser 214 can be any available industrial chlor-alkali electrolyser composed of membrane cells connected in series. In some embodiments, the electrolyser 214 contains up to 160 cells, but the total number of cells may vary. Protected metal wires 213 connect inputs of data acquisition and transmission units 202 to terminals of the cathodes or anodes in adjacent cells. In some embodiments, each unit 202 may measure up to 32 voltage inputs, but the total number may vary. The units 202 may contain analog to digital converters, digital filters, memory buffers and/or microcontrollers to execute acquisition and transmission routines. The units 202 may be electrically powered by power supply 203 using protected metal wires 215.

Data issued from units 202 may be transmitted to processing and communication unit 204. In addition to processing data transmission routines to a main computer server unit 209, unit 204 may execute and send emergency stop signals to a shutdown relay unit 206. Unit 204 may receive a transformer rectifier shunt current measurement using, for example, a 4-20 mA converter terminal 217 from unit 205. Unit 204 may broadcast voltage and current data streams sampled at a given rate, for example one point per second, to unit 209. Ethernet communication unit 207 may broadcast process data streams not measured by units 202 and 204 to computer server unit 209 coming from computing device 208. Computing device 208 may be a third-party computer server, sometimes referred to as a Distributed Control System. Some example process data includes but is not limited to: catholyte outlet temperature, caustic outlet concentration, and inlet and/or outlet pH. Units 202, 204, 209, 207 and 208 may be connected using fiber optic wire loop 216 or other connecting materials. In some embodiments, one or more of the connections is wireless. According to the embodiment illustrated, unit 209 is a main computer server that receives and processes single cell voltage, current and process data, stores all data for one or several electrolysers, executes a series of steps, and sends, if any, electrolyser shutdown orders to unit 204.

Unit 209 may be responsible for historical data collection and transformation. A similar setup may be deployed on several electrolysers 214 operating in several chlor-alkali plants. Unit 209 may store all voltage data from each one of the cells, current measurements and process data. As sampling rates of voltage measurements and the process data may differ, unit 209 may down-sample voltage observations to a given sampling rate. In some embodiments, process data collected comprises outlet caustic concentration and electrolyser outlet catholyte temperature. Unit 109 may transform and align data in a tabulated form, each row representing a different time stamp of observations, each column representing a different measurement variable. Unit 109 may store all data from several weeks of deployment of the fault detection system 218 from several electrolysers in a database.

Tabulated data may be processed to select operation cycles. An operation cycles is the interval of time between a consecutive startup and stop of an electrolyser. Its length may range from some hours to several weeks, depending on production constraints, changing demand, work shifts, or maintenance requirements. Each cycle may be divided into two phases of different lengths—the startup and the operation phase. The startup phase occurs when the electrical current increases from zero to the maximum allowed where each one of the cells reaches its full production condition. The rate at which the current increases may differ for each startup, due to changes in the operating practices decided by the plant operators. The length of the startup phase may vary, for example from 20 minutes to 12 hours. The operation phase may comprise the rest of the cycle. The electrical current may vary in this phase, for example between 50 and 100% of the total range.

In one specific and non-limiting example, pseudo code for detecting possible cycles is as follows:
FOR each observation n in the database:
$Diff_n = Time_n - Time_{n-1}$
IF $Diff_n > 10$ minutes:
Save $Time_{n-1}$ and $Time_n$
Each possible cycle is enclosed by the pair of dates corresponding to:
$(0, Time_{n-1}), (Time_n, Time_{n+1}), (Time_{n+2}, Time_{n+3}) \ldots$ In one specific and non-limiting example, pseudo code for confirming cycles is as follows:
FOR each possible cycle$_n$ with length k:
   IF any observation of the cycle has "current>16 kA":
      idx=First observation where "current>16 kA"
      IF idx<=12 hours:
         startup$_n$=cycle [0:idx]
         operation$_n$=cycle[idx:n]
         IF length (operation)>=length (startup):
            cycle$_n$ is a valid cycle Once the data is structured in cycles, a unity-based normalization scaling method may be applied to each one of the data columns. This scales the data linearly, so the values are in the range [0,1]. The scales help improve the training time for building the neural network model(s). The data columns may be scaled using the following equation:

$$X_{scaled} = \frac{X - \min}{\max - \min}$$

The minimum (min) and maximum (max) values may be used for scaling the measurement columns.

In some embodiments, a neural network model is built and trained using historical data that is collected and transformed. An encoder subnetwork infers the features that characterize the behavior of the cell voltages at a certain cycle in the startup phase. The features account for both the specificity and the normal degradation of the cell. It is a self-supervised method, as it does not need labeled degradation data. This step may be viewed as performing a dimensionality reduction. However, the encoded vector—the dimensionality-reduced vector—is not the result of a statistical procedure, but an optimal representation that eases the learning of the voltage predictor subnetwork. The length of each startup phase may differ, and may be limited to an upper value, such as a maximum of 12 hours. For example, if each time-step represents a minute, the vector given to this subnetwork has a length of 720 time-steps. Three input features may be used: electrolyser catholyte outlet temperature, plant caustic concentration and the electrical current and the voltage of the cell. The input features may be used to standardize the voltage to the specific operating conditions of each startup. In some embodiments, the shape of the input vector is [720 time-steps, 4 features]. A masking layer forces the successive layers to ignore a time-step if all the features of that time-step are equal to a masked value, which may be set to '−1' to filter the time-steps that are previously added during padding. In order to account for the temporality of the sequence, the next layer may be a Long Short-Term Memory (LSTM). After it, two dense layers may be chained to make a smoother transition to the final two-positional encoded result. An output may be a vector of coordinates [X, Y] for each cell and startup, with a shape of (1 time-step, 2 features). Moreover, these coordinates can be represented in a graph, providing an insight into the decision process taken by the network.

A predictor subnetwork may be responsible for predicting the synthetic cell voltages. In some embodiments, the two inputs used for the prediction are a window of time-steps from the operation phase and an encoded representation of the cell's startup phase. According to this embodiment, a window of four observations is enough to represent the dynamics of the chemical phenomena behind the cell's response. The encoded cell's startup may be repeated four times and concatenated with the window of operation features. Two LSTM layers may be used to find temporal correlations between the observations of each window. Two dense layers may follow, in order to output the predicted voltage. The output layer may have a sigmoid activation function, as the output voltage may have been scaled previously to the range [0, 1]. In this step, the whole model is trained by minimizing the loss between the voltage predicted by this subnetwork and the measured voltage. An Adam optimizer and a backpropagation algorithm may be used. For this subnetwork to get a good accuracy in the voltage prediction, the encoder should learn a faithful representation of the characterization of the cell.

The following pseudo code represents a specific and non-limiting example of a training loop for one observation per forward-backward pass:
FOR each cycle:
   FOR each cell in Electrolyzer:
      Define cell_startup and cell_operation
      Separate cell_operation in windows
      FOR each window.
         operating_conditions=window (without including the voltage)
         cell_voltage=last voltage observation in window
         #Forward pass
         encoded_cell_startup=encoder(cell_startup)
         predicted_voltage=predictor(operating_conditions, encoded_cell_startup)
         loss=mean_squared_error(predicted_voltage, cell_voltage)
         #Backpropagation
         update_network_weights(loss)

In order to improve the computational efficiency of this training loop, mini-batch training may be used to parallelize the computing. In this mode of training, many observations may be grouped in a batch to be processed in parallel. According to this embodiment, one or a plurality of Graphical Processing Units (GPU) are used in Unit 209 to perform this operation. In addition, three operations may be used to make the network converge efficiently: padding, shuffling and window striding. Not every cycle's startup has the same duration. However, all the batches that are fed to the GPU should have the same number of time-steps. This issue is addressed by padding the sequences, i.e. adding '−1' values at the end of each observation's corresponding startup. This way, all the startups have the same duration of 720 minutes, which is equal to the maximum duration of a startup. This padding value is later ignored by the masking layer of the encoder subnetwork, so it does not affect the results. In order to reduce the time required for the network to converge to an optimal solution, a shuffling procedure may be used where each batch has observations from different cells, cycles and electrolysers. The encoder task of inferring the cell's features during startup is more complex than that of the predictor. Hence, it is more efficient to train the network with fewer observations per cycle and more different startup sequences. The stride of windowing function may be increased to address this issue. The stride is the number that defines how many windows of the sequence are ignored between two consecutive training observations. At the end of the training loop, the built neural network predictor may be stored in a file, for example in unit 209.

In some embodiments, the fault detection system 218 is deployed in one or a plurality of electrolysers in an industrial plant. Voltages from a plurality of the cells are measured and process data from $3^{rd}$ party devices may be acquired. Alignment and cycle detection routines may be executed in real time or pseudo real time in unit 209. Pre-built neural network voltage predictor(s) may be used to calculate the synthetic voltage ($\hat{V}_t$) of the cells. A difference may be calculated between measured voltages ($V_t$) and the synthetic voltages ($\hat{V}_t$). When a threshold is reached for one or more cells, an emergency shutdown signal may be sent to unit 204 and then sent to unit 206.

Figure 4:
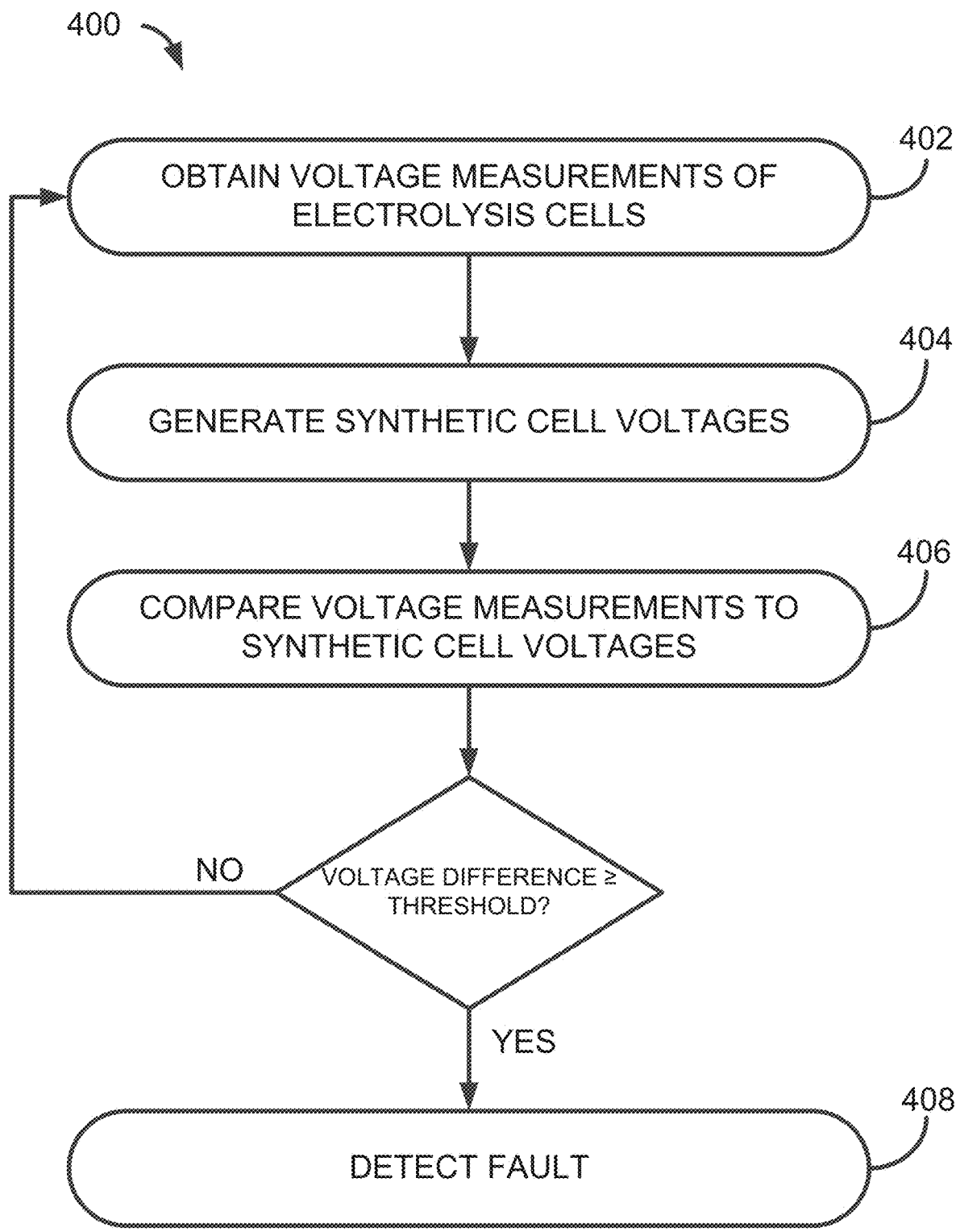
FIG. 4 is a flowchart of an example method for detecting faults in an electrolyser.

FIG. 4 is a flowchart of an example method 400 for fault detection. In some embodiments, the method 400 is performed by the fault detection system 218 of the assembly 200 of FIG. 2. In some embodiments, the method 400 is performed by a plurality of computing devices.

At step 402, the voltage measurements of electrolysis cells are obtained. At step 404 synthetic voltages for the electrolysis cells are generated, as described in more detail above. Steps 402 and 404 may be performed concurrently. In some embodiments, step 404 may be performed before step 402. At step 404, the normal degradation of an electrolysis cell is taken into account by a neural network that is trained to learn healthy electrolysis cell behavior. The synthetic cell voltage is predicted using cell-specific parameters, such that the synthetic cell voltage of two or more cells in a same electrolyser may differ.

At step 406, the voltage measurements obtained at step 402 are compared to the synthetic cell voltages generated at step 404 for corresponding cells. In other words, the synthetic cell voltage of a given cell is compared to the measured cell voltage of the same cell. The comparison is performed on a cell-by-cell basis, for any number of cells contained in the electrolysis. In some embodiments, the comparison is performed for all cells of the electrolysis, either concurrently or consecutively, using any random or predetermined order. If one or more voltage difference, obtained when comparing a measured voltage with a synthetic voltage for a given cell, reaches a threshold, a fault is detected at step 408.

The method 400 may be repeated any number of times, at random or predetermined intervals. In some embodiments, the method 400 is performed continuously until at least one fault is detected. Other embodiments may also apply.

Figure 5:
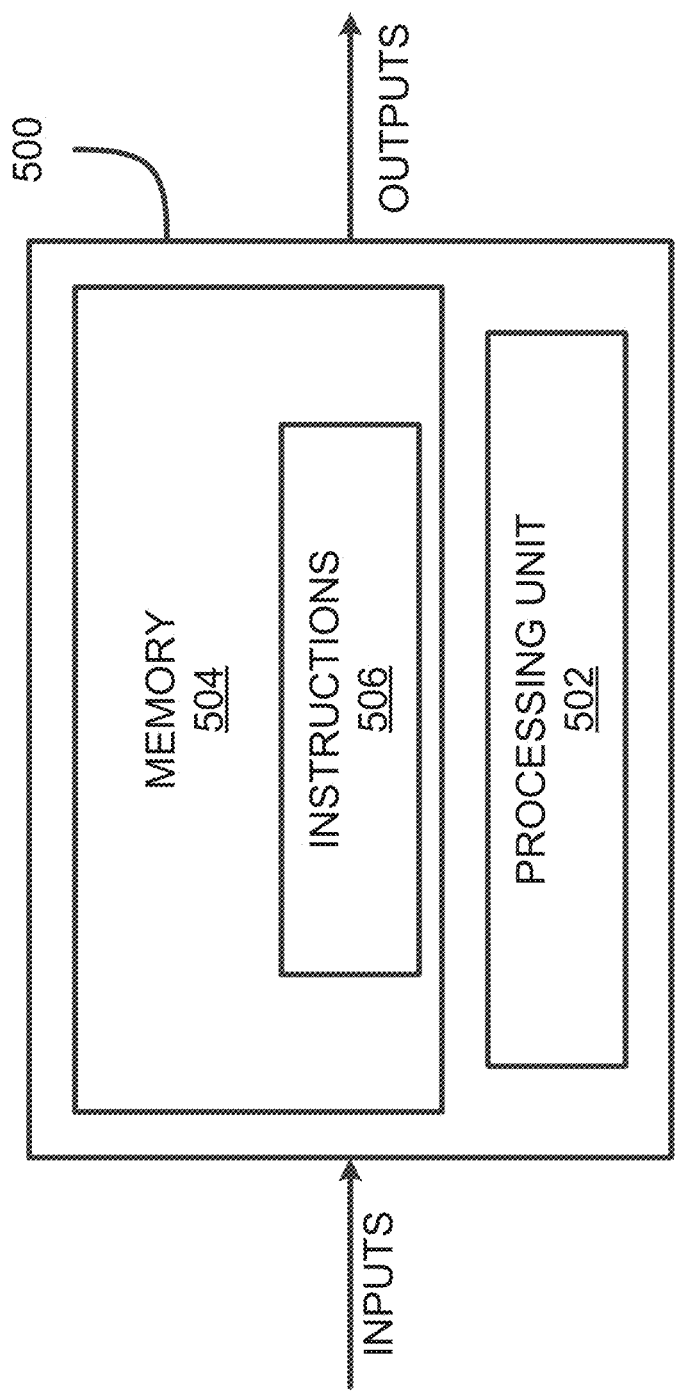
FIG. 5 is a block diagram of an example computer device.

FIG. 5 is an example embodiment of a computing device 500 for implementing the method 400 for detecting faults in an electrolyser as described above. In some embodiments, the fault detection system 218 is implemented using one or more computing device 500. The computing device 500 comprises a processing unit 502 and a memory 504 which has stored therein computer-executable instructions 506. The processing unit 502 may comprise any suitable devices configured to cause a series of steps to be performed such that instructions 506, when executed by the computing device 500 or other programmable apparatus, may cause the functions/acts/steps specified in the method 400 described herein to be executed. The processing unit 502 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise a non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

It should be noted that the techniques described herein can be performed by a computing device 500 substantially in real-time.

The methods and systems for detecting a fault in an electrolyser as described herein may be implemented in a high level procedural or object oriented programming or scripting language, or a combination thereof, to communicate with or assist in the operation of a computer system, for example the computing device 500. Alternatively, the methods and systems for detecting a fault in an electrolyser may be implemented in assembly or machine language. The language may be a compiled or interpreted language. Program code for implementing the methods and systems for detecting a fault in an electrolyser may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting a fault in an electrolyser may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, software modules may be combined or separated in different manners in order to perform the steps of the method 400, or the specific devices used to obtain the various measurements from the electrolysis cells and/or electrolyser may vary. Yet further modifications could be implemented by a person of ordinary skill in the art in view of the present disclosure, which modifications would be within the scope of the present technology.

The invention claimed is:

1. A method for detecting faults in an electrolyser having a plurality of electrolysis cells, the method comprising:
obtaining voltage measurements of the electrolysis cells during operation of the electrolyser;
generating synthetic cell voltages for the electrolysis cells using a neural network architecture trained using historical data from a plurality of electrolysers, the historical data structured in a plurality of operation cycles each comprising a startup phase and an operation phase, the neural network architecture comprising:

an encoder subnetwork configured for:
- determining, based on parameters representative of a specificity of each electrolysis cell, a cell degradation indicative of an end of a lifetime of each electrolysis cell, the parameters comprising, for each electrolysis cell, at least one of an age of the electrolysis cell, a technology of the electrolyser, and a position of the electrolysis cell in the electrolyser, and
- outputting a two-dimensional vector representing, for each electrolysis cell, the cell degradation during the startup phase; and a predictor subnetwork configured for predicting the synthetic cell voltages using the two-dimensional vector output by the encoder subnetwork;

comparing the voltage measurements to the synthetic cell voltages for corresponding ones of the electrolysis cells to obtain voltage differences; and detecting a fault in the electrolyser when at least one of the voltage differences reaches a threshold.

2. The method of claim 1, wherein the predictor subnetwork is further configured for applying temporal delays when predicting the synthetic cell voltages.

3. The method of claim 1, wherein the encoder subnetwork comprises a masking layer, a Long Short-Term Memory layer, and two dense layers.

4. The method of claim 1, wherein the predictor subnetwork comprises two Long Short-Term Memory layers and two dense layers.

5. The method of claim 1, wherein detecting the fault in the electrolyser comprises outputting an alert signal.

6. The method of claim 1, wherein detecting the fault in the electrolyser comprises outputting a signal to shut down the electrolyser.

7. The method of claim 1, wherein the electrolysis cells are chlor-alkali electrolysis cells.

8. A system for detecting faults in an electrolyser having a plurality of electrolysis cells, the system comprising:
- a processing unit; and
- a non-transitory computer-readable medium having stored thereon program code executable by the processing unit for:
- obtaining voltage measurements of the electrolysis cells during operation of the electrolyser;
- generating synthetic cell voltages for the electrolysis cells using a neural network architecture trained using historical data from a plurality of electrolysers, the historical data structured in a plurality of operation cycles each comprising a startup phase and an operation phase, the neural network architecture comprising:
  - an encoder subnetwork configured for:
    - determining, based on parameters representative of a specificity of each electrolysis cell, a cell degradation indicative of an end of a lifetime of each electrolysis cell, the parameters comprising, for each electrolysis cell, at least one of an age of the electrolysis cell, a technology of the electrolyser, and a position of the electrolysis cell in the electrolyser, and
    - outputting a two-dimensional vector representing, for each electrolysis cell, the cell degradation during the startup phase; and
  - a predictor subnetwork configured for predicting the synthetic cell voltages using the two-dimensional vector output by the encoder subnetwork;
- comparing the voltage measurements to the synthetic cell voltages for corresponding ones of the electrolysis cells to obtain voltage differences; and
- detecting a fault in the electrolyser when at least one of the voltage differences reaches a threshold.

9. The system of claim 8, wherein the predictor subnetwork is further configured for applying temporal delays when predicting the synthetic cell voltages.

10. The system of claim 8, wherein the encoder subnetwork comprises a masking layer, a Long Short-Term Memory layer, and two dense layers.

11. The system of claim 8, wherein the predictor subnetwork comprises two Long Short-Term Memory layers and two dense layers.

12. The system of claim 8, wherein detecting the fault in the electrolyser comprises outputting an alert signal.

13. The system of claim 8, wherein detecting the fault in the electrolyser comprises outputting a signal to shut down the electrolyser.

14. The system of claim 8, wherein the electrolysis cells are chlor-alkali electrolysis cells.

15. An assembly comprising:
- an electrolyser having a plurality of electrolysis cells; and
- at least one computing device operatively coupled to the electrolyser, the at least one computing device comprising at least one processing unit and a non-transitory computer readable medium having stored thereon program instructions executable by the at least one processing unit for:
- obtaining voltage measurements of the electrolysis cells during operation of the electrolyser;
- generating synthetic cell voltages for the electrolysis cells using a neural network architecture trained using historical data from a plurality of electrolysers, the historical data structured in a plurality of operation cycles each comprising a startup phase and an operation phase, the neural network architecture comprising:
  - an encoder subnetwork configured for:
    - determining, based on parameters representative of a specificity of each electrolysis cell, a cell degradation indicative of an end of a lifetime of each electrolysis cell, the parameters comprising, for each electrolysis cell, at least one of an age of the electrolysis cell, a technology of the electrolyser, and a position of the electrolysis cell in the electrolyser, and
    - outputting a two-dimensional vector representing, for each electrolysis cell, the cell degradation during the startup phase; and
  - a predictor subnetwork configured for predicting the synthetic cell voltages using the two-dimensional vector output by the encoder subnetwork;
- comparing the voltage measurements to the synthetic cell voltages for corresponding ones of the electrolysis cells to obtain voltage differences; and
- detecting a fault in the electrolyser when at least one of the voltage differences reaches a threshold.

16. The assembly of claim 15, wherein the at least one computing device comprises:
- a plurality of data acquisition and transmission units coupled to the electrolysis cells for obtaining the voltage measurements during operation of the electrolyser;

a processing and communication unit coupled to the plurality of data acquisition and transmission units; and a main computer server coupled to the processing and communication unit.

* * * * *